United States Patent Office 3,595,741
Patented July 27, 1971

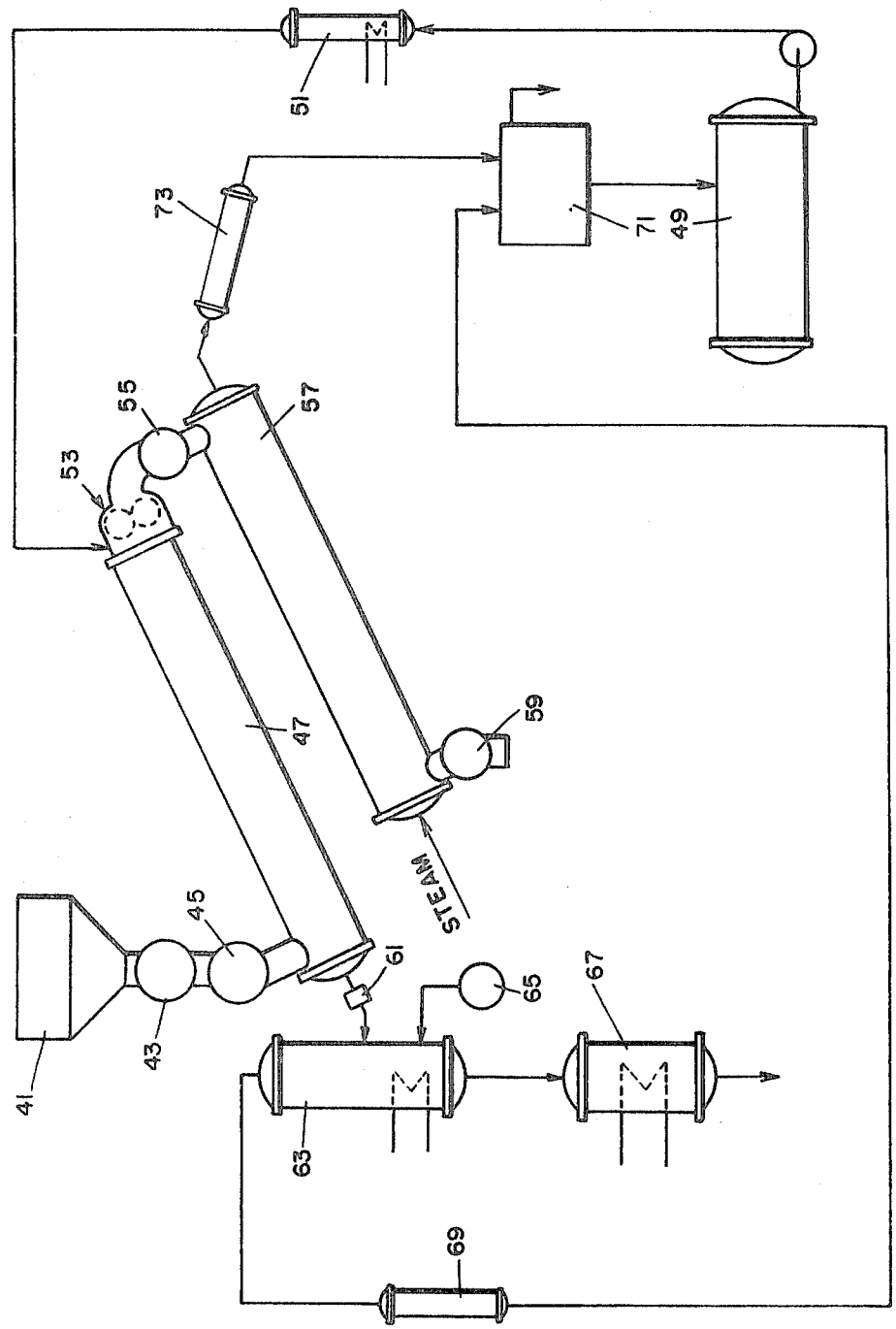

3,595,741
METHOD OF RECLAIMING STOCK FROM
WASTE MATERIAL
Robert B. Goss, Appleton, Wis., assignor to Riverside
Paper Corporation, Appleton, Wis.
Continuation-in-part of application Ser. No. 724,377,
Apr. 26, 1968. This application Mar. 9, 1970,
Ser. No. 17,892
Int. Cl. D21c 5/02
U.S. Cl. 162—5                     12 Claims

ABSTRACT OF THE DISCLOSURE

A solvent extraction method for reclaiming stock from waste materials containing natural or synthetic plastic or resin material by extracting the plastic or resin material with a suitable solvent. The miscella is separated from the stock and the solvent is recovered by distillation during which a hydrocarbon carrier is added to the miscella to form a favorable liquid waste residue which is readily recoverable from the distillation apparatus.

---

Figure 1:
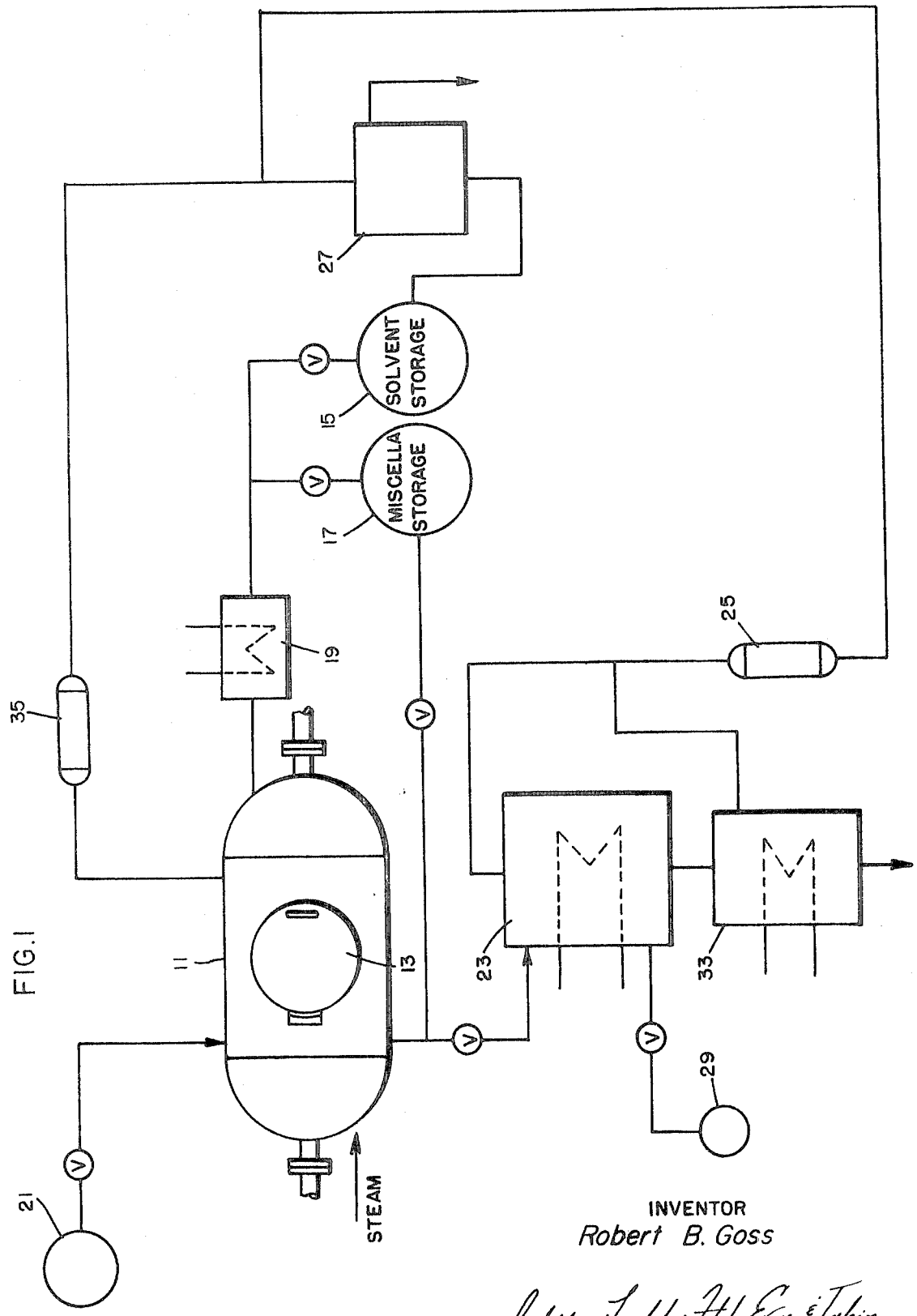

This application is a continuation-in-part of copending Ser. No. 724,377, filed Apr. 26, 1968 now abandoned.

This invention relates generally to a method of reclaiming stock from fibrous waste material, and more particularly it relates to a method of reclaiming stock from fibrous waste material containing synthetic or natural plastics and resins.

As used herein, the term "fibrous waste material" is defined as any form of fibrous product which has a plastic or resin associated therewith. The fibrous waste material may be cuttings, clippings, punchings, broke, rejects, slab sheets, used paper or any other form of waste paper generally encountered in the paper industry, or may be cuttings, clippings, thread bolt ends, scrap and other forms of waste cloth and fabric, natural or synthetic, normally encountered in the textile industry. The plastic or resin may be a coating or an impregnate, or may be more loosely associated with the fibrous waste material, for example, the plastic cover sheet in disposable diapers or plastic tabs incorporated in shirt collars.

Coated and/or impregnated paper, paperboard, and boxboard is used extensively in the manufacture of various packaging materials and containers, such as milk cartons, frozen food and juice containers, and the like. The paper pulp used in the manufacture of coated and impregnated containers for the most part is a relatively high quality pulp, and it would be desirable to reclaim, for repulping the paper stock present in the coated waste paper generated in such manufacturing. Pulp formed totally or partially from such reclaimed paper stock can be used in the manufacture of high quality paper. However, in order to use the reclaimed paper stock in the manufacture of high quality paper, all coating and impregnating materials must be substantially completely removed from the paper. As little as a small fraction of a percent of residual coating material in the reclaimed paper can be detrimental in the subsequent papermaking process, or may render the resultant paper product unuseable or aesthetically unacceptable.

A major source of waste paper is broke and rejects obtained in the manufacture of coated milk cartons and frozen food and juice cartons, although it is readily apparent that other waste paper products can be utilized. In addition to the coating and/or impregnating material, the waste paper may also include ink applied either to the paper or to the coating.

Previously, wax was used extensively as a coating material for paper products. In recent years, however, improved plastic coatings and coating methods have been developed and plastic coatings, principally polyethylene and polypropylene has substantially replaced wax as a coating material for paper products.

Similarly, various coated and/or impregnated woven or nonwoven scrap is available in the textile industry. Cellulosic textile scrap is a desirable raw material in the manufacture of rag paper. Minor amounts of coating and/or impregnating materials cannot be tolerated in such scrap and must be removed.

Various processes have been developed for reclaiming paper stock from wax and plastic coated waste paper, including the solvent extraction processes described in Pat. Nos. 2,746,862 and 3,058,871. Although the processes of these patents are successful in reclaiming paper stock from waste paper of the types described when predominant amounts of polyethylene and other coating and impregnating materials are present in the waste paper, considerable difficulty is encountered in recovering the solvent from the extract solution of solvent and dissolved plastic, referred to herein as the "miscella." Although careful control of the ratios of wax and plastic in the miscella can result in a process where the solvent may be removed from the miscella, in most instances, and particularly when the miscella contains a preponderance of plastic, complete recovery of the solvent from the miscella, as by vacuum distillation, leaves a solid waste residue in the still which cannot be economically handled or removed from the still. Further, as the solvent is distilled from the miscella, extensive deposition of the plastic may occur on the heat exchange tubes of the still thereby substantially reducing the rate of heat transfer. In commercial processes it is not practical to operate the still at temperatures above which the coating material is softened or flowable, e.g., above about 335° F. for polyethylene since most conventionally employed solvents are at least partially decomposed at these temperatures, causing loss of solvent from the system. A more serious problem encountered is that the decomposition products of the solvent are, in many instances, quite corrosive. It is also apparent that from an economical viewpoint it is not feasible to discard the solvent in the miscella from the process, and it is necessary to provide a convenient and economical method of recovering the solvent.

Mechanical processes for reclaiming paper stock from coated paper are also known. However, the mechanical processes yield large quantities of the coating materials which must be separated from the paper stock and baled, all of which unduly increases the cost of the reclaiming process.

It is a principal object of the invention to provide a method for reclaiming usable fibrous stock from fibrous waste materials containing plastics and/or resins. A further object is to provide an economical solvent extraction method for reclaiming usable fibrous stock from fibrous waste products associated with synthetic or natural plastics or resins in which the reclaimed fibrous stock is substantially free of the deleterious plastic or resin, and in which there is substantially complete recovery of solvent in the process. Another object is to provide a solid extraction process for reclaiming usable stock from fibrous waste materials containing plastics and/or resins in which the residue of the process, containing the undesired material, is readily disposable.

These and other objects of the invention will become apparent from the following detailed description and from the accompanying drawings of which:

FIG. 1 is a schematic flow diagram illustrating a batch process for practicing the invention; and FIG. 2 is a schematic flow diagram illustrating a continuous process for practicing the invention.

Generally, the invention is directed to a solvent extraction method for reclaiming usable stock from fibrous waste material containing natural or synthetic plastic or resin materials which include extracting the plastic or resin material from the waste material with a suitable solvent maintained in the liquid phase, separating the miscella from the stock, and recovering the solvent from the miscella by distillation. During distillation of the solvent from the miscella a sufficient amount of a hydrocarbon carrier is added to the miscella to form with the coating and impregnating material a flowable liquid waste residue at the conditions of solvent vaporization which is readily recoverable from the distillation apparatus.

The term "plastic," as used herein, is intended to include those natural and synthetic plastics and resins, soluble in halogenated hydrocarbon solvents, for example, trichloroethylene, which are conventionally employed as coatings and impregnates for paper, cloth and fabric.

The principal material employed in commercial barrier coating operations for coating paper is polyethylene, and there are several types of polyethylene available for coating operations having widely varyiing molecular weight, for example, between 10,000 and 1,500,000. Although for purposes of explanation the description herein is directed to polyethylene coated waste paper, the disclosed invention can also be employed for reclaiming stock from fibrous waste materials coated with other solvent soluble plastic polymers and copolymers, such as polypropylene, polyvinylchloride, polyvinylacetate, styrene-butadiene copolymers, polyvinylacetate-polyvinylchloride copolymers and polyvinylidene chloride. Also as earlier described, the plastic need not be in the form of a coating, and may be present in the form of discrete sheets, bits, and so forth. Urea formaldehyde resins and melamine formaldehyde resins are conventionally employed as impregnates to improve the wet strength of paper, and the described invention is also applicable to recovering stock from fibrous waste materials impregnated with such wet strength agents.

The fibrous waste materials may also include materials coated or impregnated with various other solvent soluble materials, including waxes, such as paraffin wax or microcrystalline wax, natural gums, resins and rubber compounds, etc. as disclosed in Pat. No. 3,048,871.

Although the invention is principally useful when the plastic is a solid or semi-solid at temperatures above the solvent boiling point, it is also contemplated to employ the invention when the plastic is molten at the solvent boiling point. For example, if the plastic, although molten and flowable at the solvent boiling point, formed a coating on the heat exchange tubes in the solvent vaporization still, it would be desirable to add a hydrocarbon carrier to the still to prevent coating of the heat exchange tubes.

Referring to FIG. 1, there is illustrated a simplified schematic flow diagram for reclaiming paper stock from polyethylene coated waste paper by means of a batch process, which may be generally similar to the process described in Pat. No. 3,058,871. In such a batch process a digester 11 is provided for contacting the solvent and the waste paper. The digester 11 may be of any convenient size and shape, and preferably includes suitable means, such as paddles, rotary impellers, etc. for agitating the mixture of solvent and waste paper to provide adequate contact between the solvent and the coating to be removed. As illustrated in FIG. 1, essentially complete and uniform agitation and contact between the solvent and the waste paper may be obtained by constructing the digester in the form of a revolving drum.

The digester 11 includes suitable means, such as a manhole 13, for introducing the fibrous waste material, e.g., waste paper into the digester. To obtain good contact between the solvent and the waste paper, the waste paper is desirably comminuted to some extent, preferably to shreds or strips of approximately one inch by one inch. However, the process readily accommodates waste paper sheets, reject blanks, crushed cartons and the like, and the size of the individual pieces of waste paper or other fibrous waste material is not particularly important so long as adequate contact time between the paper and the solvent is provided so that all of the deleterious plastic and/or resin material will be substantially completely extracted.

After the waste paper is introduced into the digester 11, the manhole 13 is securely closed, rotation of the digester is commenced, usually at a speed of between about 2 and about 8 revolutions per minute, and the solvent is introduced into the digester from the solvent storage tanks 15 or the miscella storage tank 17, as described hereinafter.

The solvent may be any solvent which is capable of dissolving the polyethylene coating and which does not deleteriously affect the stock being reclaimed. There are many well-known solvents which may be employed, for example, halogenated hydrocarbons, e.g., tetrachloroethane, trichloroethylene, ethylene dichloride, pentachloroethane, and perchloroethylene, toluene, xylene, and Decalin, and selection of the particular solvent is considered to be within the skill of the art. Trichloroethylene is a preferred solvent because it is non-corrosive and non-flammable, and the process is described herein using trichloroethylene as the solvent.

The amount of solvent employed to extract the polyethylene may vary widely, depending upon the contact time in the digester, the temperature of the extraction, the percentage of polyethylene in the waste paper, and the number of extraction cycles which are contemplated. The amount of coating material in the waste paper may vary between about 1 percent and about 40 percent by weight of the coated waste paper, but is usually between about 3 percent and about 20 percent by weight. Good results can be obtained when the amount of solvent introduced into the digester is between about 5 and about 30 pounds per pound of waste paper stock. It is apparent, however, that other ratios of solvent to waste paper stock may be readily employed depending upon the particular conditions encountered.

To facilitate rapid dissolution and extraction of the polyethylene, the extraction is desirably carried out at an elevated temperature. Heating of the digester may be accomplished by a steam jacket, and the solvent may be preheated to the desired temperature by means of a heat exchanger 19 in the solvent supply line. When the solvent is trichloroethylene, the digester may be maintained at a temperature of between about 130° F. and about 240° F., preferably about 220° F. Trichloroethylene has a boiling point of 186° F. at atmospheric pressure, and in order to maintain the trichloroethylene in the liquid phase at 220° F. the digester is maintained at an elevated pressure of, for example, between about 5 and about 25 p.s.i.g. in accordance with known practices. An elevated pressure may be conveniently maintained within the digester by means of compressed air introduced into the digester from a compressed air source 21, or by the vapor pressure of trichloroethylene.

The length of time of the extraction is dependent upon the percentage of polyethylene in the waste paper, the ratio of solvent to waste paper, the extraction temperature, and the number of extraction cycles to be performed on the batch of waste paper. Good results have been obtained in a process having three extraction cycles in which a contact time of 11 minutes per extraction cycle was employed. Depending upon the indicated variable, contact times of between about 5 minutes and about 30 minutes per extraction cycle are contemplated.

It is important that the temperature within the digester be maintained below the softening point of the plastic material which is being extracted. If the temperature in the digester is permitted to rise above the temperature at which the plastic becomes semisolid or flowable, some plastics may diffuse into the interior of the paper stock making it more difficult to obtain substantially complete extraction of the plastic from the paper stock.

At the end of the extraction cycle the miscella is withdrawn from the digester and is either returned to a miscella storage tank 17, if it is to be used in another extraction cycle, or delivered to a solvent recovery still 23 for separation of the solvent from the extracted plastic.

In commercial practice it has been found that when ratios of between about 10 and about 30 pounds of solvent per pound of fibrous waste material are utilized, the miscella may be employed in two or three additional extraction cycles before its extractive powers are reduced to the point where it is desirable to recover the solvent from the miscella. For example, in a three cycle batch extraction, the raw material waste paper may be initially contacted with miscella which has been used in two previous extraction cycles. In the second extraction cycle the partially extracted waste paper is contacted with miscella which has been used in one cycle, followed by a third and final extraction cycle with fresh solvent. It is apparent that in such a process further miscella storage tanks, in addition to tank 17, may be employed in order to provide suitable storage for the different batches of miscella.

When the extractive power of the miscella is exhausted to the point where recovery of the solvent is desirable, the miscella is delivered to the solvent recovery still 23 for distillation of the solvent from the miscella. When trichloroethylene is employed as a solvent, it may be recovered from the miscella in the solvent recovery still at a vacuum of between 0 and about 20 inches of mercury preferably about 12 inches of mercury, and at a temperature of between about 150° F. about 250° F., preferably about 220° F. It is apparent that other conditions may be readily employed in the distillation in accordance with known techniques.

The vaporized solvent is condensed in a suitable condenser 25 and passed to a condensate separator 27 where any entrained water is separated by decanting. The purified solvent is returned from the condensate separator to the solvent storage tank 15 for re-use in the process.

As discusssed, it has heretofore been difficult to recover the solvent in the still 23 when the dissolved solids in the miscella contain preponderant amounts of plastic because the waste residue, after solvent distillation, freezes in the distillation still, or is so viscous that it cannot be conveniently handled and removed from the still. In accordance with the described invention, this shortcoming is conveniently and economically overcome by adding a hydrocarbon carrier to the miscella in the solvent recovery still 23. The hydrocarbon carrier and the plastics and extracted materials form a liquid flowable waste residue which can be easily removed from the still for disposal. In most instances, it is desirable to add a hydrocarbon carrier to the miscella whenever the plastic content of the solids in the miscella exceeds about 50 percent, and it may, depending on particular conditions, be desirable to add a hydrocarbon carrier at lower plastic contents.

It is not completly understood precisely how the hydrocarbon carrier functions in the still 23. It is believed, although the disclosed invention is not considered to be limited thereto, that the hydrocarbon carrier performs several important functions within the still 23. It is possible that the hydrocarbon carrier acts as a partial solvent, that is, some fraction of the plastic is dissolved in the hydrocarbon carrier at the operating conditions within the still. However, only a small fraction, if any, of the plastic is dissolved in the hydrocarbon carrier and a principal function of the hydrocarbon carrier would appear to be that of a precipitating medium for the plastic solids which precipitate from the miscella as the solvent is vaporized, thereby forming a suspension in which the plastic solids are the discontinuous phase and the hydrocarbon carrier is the continuous phase. Most advantageously, the plastic precipitates in the form of very finely divided particles in order to provide a stable waste residue suspension having good stability. In accordance with the invention, the waste residue suspension is quite stable and there is only a slight separation of hydrocarbon carrier after storage of the waste residue for several weeks at ambient conditions.

Another important function which is believed to be provided by the hydrocarbon carrier is that it forms a film on the heat exchange tubes in the recovery still 23 and prevents, to a large extent, coating of the heat exchange tubes by the plastic solids which precipitates from the miscella as the solvent is evaporated.

In any event, it is known that the hydrocarbon carrier must be liquid and substantially nonvolatile at the operating conditions of the solvent recovery still. Further, the hydrocarbon carrier must be miscible with the solvent and should provide a precipitating medium in which the plastic solids will precipitate in finely divided form in order to form a stable waste residue suspension. The suspension must have a sufficiently low viscosity that it is fluid and flowable at the conditions within the recovery still and can be readily withdrawn from the still using conventional fluid handling apparatus. In addition, the hydrocarbon carrier is desirably a film forming material so that a thin film of the hydrocarbon carrier will be formed on the interior surface of the still and paticularly on the heat exchange tubes.

Several types of hydrocarbon carriers may be utilized within the scope of the invention. A preferred hydrocarbon carrier is petroleum hydrocarbon having a boiling point above 300° F. Mixtures of petroleum hydrocarbons are found to be useful, for example, kerosene or fuel oil, having mean boiling points of between 475° F. and 600° F., although other petroleum hydrocarbons such as crude oil, gas oil and diesel fuel may also be utilized. Other hydrocarbon materials may also be employed which have desired boiling points, and which form stable suspensions with the solids in the miscella as the solvent is vaporized. However, the preferred hydrocarbon carrier is a petroleum hydrocarbon.

When the hydrocarbon carrier is a petroleum hydrocarbon, e.g., fuel oil, the waste residue suspension obtained after removal of the solvent is quite stable and there is only minimal separation of fuel oil from the suspension after storage at ambient conditions for several weeks. The use of a petroleum hydrocarbon carrier results in the formation of a waste residue suspension which has characteristics which are quite similar to the characteristics of paraffins wax, including those of crystallizing at a particular temperature, depending on the ratio of fuel oil to plastic, and melting when reheated above the crystallization point.

The use of a petroleum hydrocarbon carrier is also particularly advantageous in that waste residues containing petroleum hydrocarbons are readily combustible, permitting disposal of the waste residue by burning in an oil fired boiler or furnace. Burning of the waste residue eliminates the serious problem of stream pollution, and, in addition, permits recovery of the caloric value of both the fuel oil and the plastic, thereby reducing the overall costs of the paper recovery process. The waste residue suspension may be delivered directly from the recovery still to the furnace, or, if desired, may be stored in suitable storage vessels, thereby permitting intermittent burning of the waste residue in the furnace.

The hydrocarbon carrier may be introduced into the recovery still 23 from a suitable storage tank 29. As indicated, the amount of hydrocarbon carrier introduced into the still is controlled so that the suspension of solid extracted material and hydrocarbon carrier is fluid at the operating conditions within the still. In this connection, the amount of hydrocarbon carrier may be varied within wide limits depending upon the operating conditions within the still. When the dissolved plastic in the miscella is substantally 100 percent polyethylene, about three to four pounds of fuel oil per pound of polyethylene provides a flowable suspension which can easily be removed from the still at a temperature of 180° F. to 185° F. When cooled to ambient conditions this suspension sets up to form a semi-solid mass which may be easily disposed by collectign in containers and burning. Alternately, additional amounts of hydrocarbon carrier can be introduced either in the still or mixed with the residue from the still to provide a waste residue which is flowable and fluid at ambient conditions, or the still may be operated at higher temperatures with lower ratios of hydrocarbon carrier to plastic.

The waste residue obtained from the recovery still 23 is desirably delivered to a finishing still 33 for vaporization of entrained solvent. The solvent vaporized in the finishing still 33 is condensed in the condenser 25 and returned to the solvent storage tank 15 as described. The waste residue suspension of solid plastic and hydrocarbon carrier is withdrawn from the finishing still 35 and is disposed of in any convenient manner, e.g., by burning.

The residual solvent retained in the paper stock in the digester 11 after withdrawal of the miscella may be recovered by steam stripping in accordance with known practices. It has been found that between about 0.5 pound and about 0.75 pound of steam per pound of paper stock in the digester will remove substantially all solvent retained in the stock. The mixture of steam and solvent vapors is condensed in a suitable condenser 35 and the condensate is delivered to the condensate separator 27 in which the water is decanted from the solvent, the solvent being returned to the solvent storage tank 15.

The present invention may also be practiced in a continuous process, and in this connection there is illustrated in FIG. 2 a simplified schematic flow diagram of a continuous countercurrent process in which the fibrous waste material is delivered from a storage bin 41 through one or more pressure locks 43, 45 into the lowermost end of an inclined digester 47. The waste material is propelled upwardly in the inclined digester 47 by means of a suitable screw conveyor, chain conveyor or the like, not illustrated, and the digester may contain suitable baffles and/or other means for causing mixing and agitation of the waste material during extraction.

Solvent is continuously withdrawn from a solvent storage tank 49, preheated in a suitable heat exchanger 51, and introduced into the inclined digester adjacent the upper-most end thereof. It will be seen that the solvent and waste material travel countercurrently within the inclined digester 47, the waste material being carried upwardly by means of the conveying apparatus, and the solvent percolating downwardly by gravity. Suitable means, not shown, may be utilized for pressurizing the digester in order that the extraction may be carried out at an elevated temperature.

The size and the shape of the inclined digester 47, and the volume and flow rate of solvent and waste paper passing therethrough may be conveniently adjusted in order to insure that substantially all of the plastic will be extracted in the digester, and that the stock will be substantially free of plastic when it reaches the upper end of the digester.

Residual solvent remaining in the stock may be partially removed by means of compression flights in the screw conveyor or other compressing means such as rollers indicated diagrammatically by numeral 53, within the upper end of the digester 47, the solvent squeezed from the stock being returned to the digester. To remove the remaining residual solvent, the stock is removed from the digester 47 through a pressure lock 55 and delivered into an inclined stripping column 57. The stock is caused to travel downwardly in the still 57 and is exposed to a countercurrent flow of steam for stripping of the remaining solvent from the stock. The solvent free stock is removed from the lower end of the still through pressure lock 59.

The miscella is withdrawn from the lower end of the inclined digester 47 through a suitable pressure valve 61, and is introduced into a solvent recovery vacuum still 63.

A hydrocarbon carrier is continuously introduced to the solvent recovery still 63 from a storage tank 65. The waste residue suspension of hydrocarbon carrier and plastic is withdrawn from the bottom of the still 63 and delivered to a finishing still 67 for removal of entrained solvent. The solvent free waste residue is withdrawn from the finishing still 67 and is disposed of, as by burning.

The vaporized solvent from the stills 63 and 67 is condensed in a condenser 69 and the condensate is delivered to a condensate separator 71 where the water is separated from the solvent by decantation. Similarly, the steam and residual solvent vapors are withdrawn from the upper end of the stripping column 57 and are condensed in a condenser 73 and delivered to the condensate separator 71 for reuse in the process. Purified solvent is returned from the condensate separator 71 to the solvent storage tank 49.

EXAMPLE I

Paper stock was reclaimed from polyethylene coated waste paper in a three cycle batch extraction process. 3000 pounds of polyethylene coated paper broke and carton rejects, including cartons having printing on the surface of the polyethylene containing 7.6 percent by weight polyethylene were introduced into a rotatable generally cylindrical digester having a diameter of 8.5 feet and a length of 9.2 feet and rotation of the digester at 4½ r.p.m. was commenced. The digester was then pressurized with compressed air to a pressure of 15 p.s.i.g., and heated to a temperature of 210° F. by a steam jacket. 17,000 pounds of trichloroethylene miscella which had been employed in two previous extraction cycles was preheated to 210° F. by means of a heat exchanger and introduced into the digester.

The waste paper and miscella were contacted in the digester for a period of 11 minutes, after which time the miscella was withdrawn from the digester and delivered to a solvent recovery still operating at a vacuum of 7 inches of mercury and a temperature of 185° F. vaporize the solvent from the miscella. The miscella entering the solvent recovery still had a polyethylene content of about 1.6 percent by weight. After all of the miscella was introduced into the still 869 pounds of No. 2 fuel oil was added to the still. Vaporization of the trichloroethylene was continued for 25 minutes, after which time substantially all of the trichloroethylene was vaporized, leaving a residue suspension of fuel oil and polyethylene in the bottom of the still. This suspension, which was a readily flowable liquid suspension of solid polyethylene and fuel was withdrawn from the solvent recovery still and introduced into a finishing still operating at a vacuum of 10 inches of mercury and a temperature of 180° F. for further vaporization of residual entrained trichloroethylene. After a residence time of 15 minutes in the finishing still, the suspension of polyethylene and fuel oil was withdrawn from the finishing still and drummed for disposal. Upon cooling to ambient conditions the suspension sets up into a semi-solid mass.

The vaporized trichloroethylene from the recovery still and the finishing still was condensed in a water cooled condenser, and delivered to a condensate separator where the water and trichloroethylene were separated by decantation, the water being wasted and the purified solvent being delivered to a fresh solvent storage tank.

In the second cycle of the three cycle extraction process the partially extracted waste paper was extracted with 17,000 pounds of miscella which had been employed in a single previous extraction cycle at a temperature of 209° F. and at a pressure of 12 p.s.i.g. The miscella was preheated to a temperature of 210° F. After a contact time of 11 minutes the miscella was withdrawn and delivered to a miscella storage tank for reuse in the process.

In the third and final cycle of the extraction process 17,000 pounds of fresh solvent was introduced into the digester after being preheated to a temperature of 210° F., and the digester was maintained at a temperature of 210° F. and at a pressure of 15 p.s.i.g. At the end of 11 minutes the miscella was withdrawn from the digester and delivered to a miscella storage tank for use in further extractions.

Residual solvent retained in the paper stock in the digester was removed by steam stripping by introducing 1000 pounds of steam per hour into the digester for a period of 30 minutes. The mixture of steam and vaporized trichloroethylene withdrawn from the digester was condensed in a water cooled condenser and delivered to the aforementioned condensate separator where the trichloroethylene was separated from the water and returned to the fresh solvent storage tank.

The reclaimed paper stock was dumped from the digester and examined. It was found that the paper stock contained substantially no residual polyethylene or ink, and the paper stock was repulped for use in the manufacture of high quality white bond paper.

EXAMPLE II

In an example a continuous process for reclaimed paper stock from polyethylene coated waste paper, 5000 pounds per hour of polyethylene coated broke and rejected cartons, containing 7.6 percent by weight polyethylene, were continuously introduced into an inclined screw conveyor digester having a length of 16 feet and a diameter of 2 feet. 32,000 pounds per hour of trichloroethylene, preheated to a temperature of 210° F. were introduced into the upper end of the inclined digester and the digster maintained at a pressure of 12 p.s.i.g. by means of compressed air, and at a temperature of 210° F. by a steam jacket. The flow of trichloroethylene downwardly through the inclined digester was controlled so that the digester was substantially flooded with trichloroethylene. The average residence of the waste paper stock and trichloroethylene in the digester was 30 minutes. The extracted paper stock was compressed in the upper-most portion of the inclined digester to partially remove solvent, and was then passed through a pressure lock into the upper end of an inclined stripping column having a length of 16 feet and a diameter of 2 feet. The paper stock was conveyed downwardly within the stripping column by means of a screw conveyor and a countercurrent flow of 1500 pounds per hour of steam was introduced into the lower end of the stripping column for removal of residual solvent from the paper stock. The average residence time of the paper stock within the stripping column was 30 minutes.

The paper stock, freed of residual solvent, was removed from the lower-most end of the stripping column and repulped for use in manufacturing high quality tablet paper.

The miscella withdrawn from the lower-most end of the inclined digester was continuously delivered into a solvent recovery distillation column for vaporization of trichloroethylene. The distillation column was operated at a vacuum of 8 inches of mercury and was heated, by means of steam coils, to a temperature of 185° F. 620 pounds per hour of No. 2 fuel oil were continuously introduced adjacent the bottom of the distillation column and a fluid suspension of fuel oil and polyethylene was continuously withdrawn from the bottom of the distillation column at a rate of 1250 pounds per hour and introduced into a finishing still. The finishing still was operated at a vacuum of 10 inches of mercury and was heated to a temperature of 180° F. by means of steam coils. A substantially solvent free stream of fuel oil and polyethylene was removed from the finishing still at a rate of 1000 pounds per hour.

The vaporized trichloroethylene withdrawn from the distillation column and the finishing still was condensed in a water cooled condenser and delivered to a condensate separator. Similarly, the mixture of steam and vaporized trichloroethylene withdrawn from the upper end of the stripping column was condensed in a water cooled condenser and delivered into the condensate separator. In the condensate separator the water and trichloroethylene were separated by decantation, the trichloroethylene being returned to the storage tank, and the water being wasted.

It will be seen from the foregoing that a method has been provided for conveniently and economically reclaiming fibrous material from fibrous waste material coated with a high melting point plastic. The described method may be utilized to recover paper stock from waste paper coated with many different plastics and/or impregnated with many different resins. Further, the method may be utilized to recover paper stock from waste paper in which printing has been applied to the plastic coating without having to first process the waste paper in a de-inking operation. The paper stock which is obtained by the process may be directly repulped and employed in a papermaking operation without further processing. The waste residue of plastic material and hydrocarbon carrier may be conveniently handled using conventional equipment and the viscosity of this waste residue may be varied at will depending on the manner of disposal contemplated.

The described method may also be employed to recover cloth or fabric from waste textile products containing plastics and resins. It is further contemplated that instead of fibrous waste material, the described method may utilize a nonfibrous scrap material such as metal scrap, wire or the like containing a plastic or resin which is to be removed.

Although certain features of the method have been particularly set forth for purposes of description, it is apparent that various alternatives and equivalent steps within in the skill of the art might also be employed.

Various features of the invention are set forth in the following claims.

What is claimed is:

1. In a method of reclaiming stock from fibrous waste material containing undesired plastic which includes extracting the plastic from the waste material with a solvent within an extraction zone thereby forming a miscella of solvent and dissolved plastic, maintaining the extraction zone at a temperature below the softening point of the plastic and at a pressure sufficient to maintain the solvent in the liquid phase, separating the stock from the miscella, and recovering the solvent from the miscella by vaporization yielding a solid plastic residue, the improvement comprising adding to the miscella prior to detrimental precipitation of plastic solids therefrom as solvent is vaporized an amount of a hydrocarbon carrier sufficient to form a liquid flowable waste residue at the temperature and pressure of solvent vaporization, which hydrocarbon carrier has a boiling point above the boiling point of the solvent and is miscible therewith, and which forms a stable suspension with the precipitated solid plastic.

2. A method in accordance with claim 1 wherein the hydrocarbon carrier is a petroleum hydrocarbon.

3. A method in accordance with claim 2 wherein the petroleum hydrocarbon is kerosene, fuel oil, diesel fuel, gas oil or mixtures thereof.

4. A method in accordance with claim 2 wherein the petroleum hydrocarbon is added to the miscella in an amount of at least about 3 pounds of petroleum hydrocarbon per pound of plastic in the miscella.

5. A method in accordance with claim 4 wherein the petroleum hydrocarbon is kerosene, fuel oil, diesel fuel, gas oil or mixtures thereof.

6. A method in accordance with claim 2 wherein the waste residue is disposed of by burning.

7. In a method of reclaiming stock from fibrous waste material containing undesired plastic which includes liquid phase extraction of the plastic from the waste material with a solvent thereby forming a miscella of solvent and dissolved plastic at a temperature below the softening point of the plastic and at a pressure sufficient to maintain the solvent in the liquid phase, separating the stock from the miscella, and recovering the solvent from the miscella by vaporization yielding a solid plastic residue, the improvement including adding to the miscella prior to detrimental precipitation of plastic from the miscella a liquid precipitating medium into which the plastic precipitates as solvent is vaporized, the liquid precipitating medium comprising a hydrocarbon carrier that is miscible with the solvent, has a boiling point above the boiling point of the solvent, and forms with the precipitated plastic a stable suspension, the amount of hydrocarbon carrier added to the miscella being sufficient to form a liquid flowable waste residue at the conditions of solvent vaporization.

8. A method in accordance with claim 7 wherein the hydrocarbon carrier is a petroleum hydrocarbon.

9. A method in accordance with claim 8 wherein the petroleum hydrocarbon is kerosene, fuel oil, diesel fuel, gas oil or mixtures thereof.

10. A method in accordance with claim 8 wherein the petroleum hydrocarbon is added to the miscella in an amount of at least about 3 pounds of petroleum hydrocarbon per pound of plastic in the miscella.

11. A method in accordance with claim 10 wherein the petroleum hydrocarbon is kerosene, fuel oil, diesel fuel, gas oil or mixtures thereof.

12. A method in accordance with claim 8 wherein the waste residue is recovered as a flowable liquid suspension and is burned in an oil fired furnace.

References Cited

UNITED STATES PATENTS

| | | | |
|---|---|---|---|
| 2,607,678 | 8/1952 | Scheid | 162—5 |
| 3,058,871 | 10/1962 | Davis et al. | 162—5 |
| 3,226,343 | 12/1965 | Rhodes | 162—5X |

HOWARD R. CAINE, Primary Examiner

U.S. Cl. X.R.

162—72